United States Patent [19]

Assaf et al.

[11] Patent Number: 4,894,993
[45] Date of Patent: Jan. 23, 1990

[54] METHOD OF AND APPARATUS FOR PRODUCING POWER FROM SOLAR PONDS

[75] Inventors: Gad Assaf, Rehovot; Uriyel Fisher, Haifa, both of Israel

[73] Assignee: Solmat Systems, Ltd., Yavne, Israel

[21] Appl. No.: 128,824

[22] Filed: Dec. 4, 1987

[51] Int. Cl.$^4$ ............................. F03G 7/02; F01K 9/00
[52] U.S. Cl. ..................................... 60/641.8; 60/688; 60/689
[58] Field of Search ...................... 60/641.8, 688, 689; 126/400, 415

[56] References Cited

U.S. PATENT DOCUMENTS

| | | |
|---|---|---|
| 3,372,691 | 3/1968 | Shachar . |
| 3,393,515 | 7/1968 | Tabor et al. . |
| 3,409,782 | 11/1968 | Bronicki . |
| 3,935,902 | 2/1976 | Heller et al. .................... 60/688 X |
| 4,377,071 | 3/1983 | Assaf et al. ....................... 60/641.8 |
| 4,440,148 | 4/1984 | Assaf . |
| 4,506,508 | 3/1985 | Coers .............................. 60/688 X |
| 4,541,244 | 9/1985 | Assaf . |
| 4,571,947 | 2/1986 | Bronicki ........................... 60/641.8 |
| 4,622,949 | 11/1986 | Yahalom ....................... 60/641.8 X |

Primary Examiner—Allen M. Ostrager
Attorney, Agent, or Firm—Sandler & Greenblum

[57] ABSTRACT

Power is produced by a power plant using a salt-water solar pond comprising an upper wind-mixed layer, a halocline and a lower convective heat storage layer. The power plant includes a heat engine for utilizing heat present in the heat storage layer of the solar pond and a condenser, which preferably is cooled by liquid droplets. In accordance with a specific embodiment of the invention the power plant is positioned within the solar pond and a flash evaporator is used in the heat engine to produce steam which is supplied to a turbine connected to a generator, the heat depleted steam exiting from the turbine and being cooled by liquid droplets in a direct-contact condenser. The size of the droplets is selected such that the heat extracted in the condenser penetrates the majority of the liquid content of most of the droplets.

31 Claims, 2 Drawing Sheets

METHOD OF AND APPARATUS FOR PRODUCING POWER FROM SOLAR PONDS

BACKGROUND OF THE INVENTION

In recent years, mainly because of the energy crisis, salt water solar ponds have been developed for utilization as alternative energy sources. Conventionally, salt water solar ponds comprise an upper wind-mixed layer, a lower convective heat storage layer and an insulating salt-gradient halocline interposed between the upper wind-mixed layer and lower heat storage layer. Solar radiation incident on the solar pond penetrates the upper and halocline layers reaching the lower layer where it is stored, due to the presence of the insulating halocline. The stored radiation available in the form of heat at temperatures up to 100° C. or more provides an energy source suitable for heating purposes or generating electrical power.

In order to produce power from salt water solar ponds, it is necessary to extract heat from the storage layer. In addition, the heat engine used to produce power conventionally contains a condenser which needs to be cooled. U.S. Pat. No. 3,372,691 discloses a system for converting bodies of water into efficient solar collectors or solar ponds which can be used for power production. In order to use this technique to produce power, pumps which consume energy, are required for extracting hot brine from the heat storage layer and sea water supplied from the sea is needed to cool the condenser of a heat engine in an indirect heat exchanger.

In U.S. Pat. No. 4.377.071 a solar energy power station is disclosed wherein the heat storage layer of a solar pond and the wind-mixed layer of the pond respectively form the heat source and heat sink of the power station. The power plant includes a boiler, responsive to water from the heat storage layer, for vaporizing a working fluid, a prime mover for producing work by extracting heat from vaporized working fluid and a condenser cooled by water from a cooling pond connected to the solar pond such that only water in the wind-mixed layer is exchanged with water from the cooling pond. Once again, pumps which consume electrical power supply hot brine from the heat storage layer to the boiler, while the condenser used in the system is an indirect heat exchanger. Both these factors reduce the overall efficiency of this power station.

It is therefore an object of this invention to provide a new and improved method of and apparatus for producing electrical power from a salt water solar pond wherein the disadvantages of the prior art, as outlined above, particularly in relating to overall efficiency, are reduced or substantially overcome.

SUMMARY OF INVENTION

In accordance with the present invention, a power plant having a heat engine and a condenser heat exchanger produces power from heat contained in the heat storage layer of a salt water solar pond. Preferably, the condenser is cooled by liquid droplets. In a specific embodiment of the present invention, the heat engine comprises a flash evaporator and a turbine which is responsive to vapors produced by the flash evaporator. The heat depleted vapors exiting from the turbine are cooled in a direct contact condenser heat exchanger. The size of the droplets used to cool the condenser is chosen such that the heat absorbed by them penetrates to the majority of the liquid content of most of the droplets while releasing only a minimal amount of gases. By using a flash evaporator, hot brine is extracted from the storage layer without the need for any pumps.

BRIEF DESCRIPTION OF THE DRAWINGS

Embodiments of the present invention are shown in the accompanying drawings wherein.

DETAILED DESCRIPTION OF THE PREFERRED EMBODIMENTS

Figure 1:
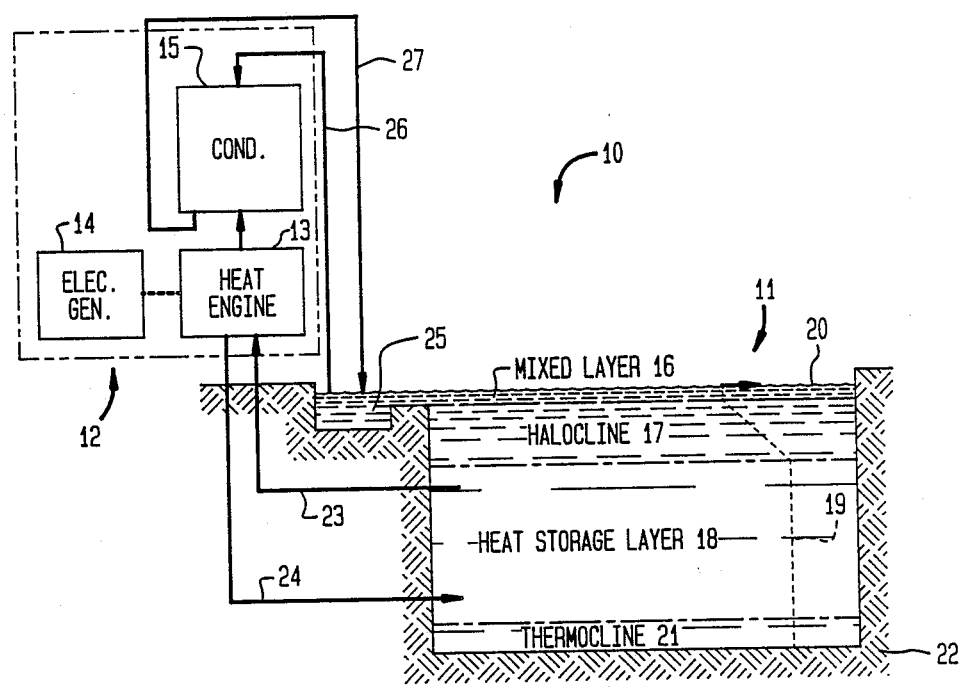
FIG. 1 is a schematic illustration of a solar pond and associated power plant.

Referring now to the drawings and more particularly to FIG. 1, reference numeral 10 designates a power plant of the type described comprising salt water solar pond 11 powering plant 12 which utilizes heat engine 13 for converting heat extracted from the pond into electricity by driving electric generator 14. Pond 11 has a three layer regime: an upper, convective wind-mixed layer 16 of relatively low, uniform salinity (e.g. 3–5%) and having a depth of 30–50 cm., intermediate non-convective halocline 17, 1–1.5 m. deep, having a downwardly directed salinity gradient with maximum salinity at the bottom in the vicinity of 25–30% for absorbing solar radiation that penetrates the wind mixed layer, and lower heat storage layer 18 of 25–30% uniform salinity for storing sensible heat by absorption of solar radiation penetrating to the heat storage layer. The depth of heat storage layer 18 ranges from 0.5–5 m. depending on the amount of heat storage desired. For reference purposes, the salinity profile is shown in FIG. 1 by curve 19. Surface 20 of the solar pond is maintained at a substantially constant level against evaporation by adding replacement liquid, e.g. make-up water, to wind mixed layer 16.

As is well known, solar radiation incident on surface 20 of the solar pond is absorbed in the various layers of the solar pond. Heat absorbed in wind-mixed layer 16 is quickly dissipated to the atmosphere because layer 16 is convective. Thus, heated water quickly rises to the surface because it is lighter than the surrounding water, and the heat is dissipated to the ambient air. The temperature of layer 16 in solar pond 11 thus approximates ambient temperature. The temperature of the halocline, however, increases with depth since convection currents are prevented due to the increasing density with depth of the water in the halocline. Thus, the temperature profile of the pond above the heat storage layer closely matches salinity profile 19. After a period of time depending upon the latitude of the pond, a steady-state condition is reached at which the temperature in the heat storage layer may reach over 100° C. for a depth of several meters. Thermocline 21 beneath the heat storage layer is of uniform salinity, but the temperature therein decreases uniformly with depth. Finally, heat is also transferred between the water and ground 22 beneath and surrounding the pond.

Power plant 12 includes heat engine 13 for extracting heat from the heat storage layer. Hot brine is extracted from the heat storage layer through conduit 23 and conveyed to heat engine 13 where some of the heat contained therein is converted into useful work in the form of electricity by driving electric generator 14. After the heat is extracted, the cooled brine returns to the heat storage layer through conduit 24. Preferably heat engine 13 is a Rankine cycle heat engine consisting of a heat exchanger (not shown) for vaporizing working fluid and a turbine (not shown) responsive to the passage of heated working fluid for driving the generator and producing heat depleted working fluid. The heat depleted working fluid is subsequently exhausted from the turbine into condenser 15 housed in a housing (not shown) where the working fluid is finally cooled and condensed into a liquid. Heat engine 13 can take the form shown in U.S. Pat. Nos.: 3,393,515 and 3,409,782, where the working fluid is an organic fluid. Where convenient, power plant 12 can be located in solar pond 11.

Condenser 15 is cooled by cooling water extracted from reservoir 25 through conduit 26, the source of the reservoir being derived from wind mixed layer 16. Alternatively, the source of reservoir 25 can be a conventional source of water such as river water or reservoir water. Also, if preferred, brine may be used as the cooling fluid. The warmed cooling water exits from the condenser through conduit 27 and returns to reservoir 25 where it is cooled by exchange with wter from the wind-mixed layer, the heat being dissipated in the atmosphere. If desired, however, cooling spray or towers can alternatively be used.

In a particular embodiment of condenser 15, liquid droplets are used to cool the condensate. Liquid droplets are more effective in cooling than continuous liquid flow since the droplets present more surface area to the medium to be cooled. Preferably, condenser 15 is a direct contact condenser. With condenser 15 being usually under vacuum, it is particularly important to minimize the amount of non-condensible gases present in the cooling liquid. In actual fact, this is also true for many, direct-contact heat exchangers used in various energy systems e.g. Ocean Thermal Conversion (OTEC) systems, etc. This is because the greater the amount of non-condensible gases present the greater is the effect on heat exchange coefficients and the larger the area needed for the condensing process. In addition, the vacuum pump used (not shown) will have to evacuate more gases and consequently more energy will be consumed. In the present patent application, the radius of the cooling liquid droplets is chosen such that the heat extracted in the condenser heat exchanger penetrates to the larger part of the liquid content of most of the droplets while ensuring that only a minimal amount of gases is released from the liquid. Such a process is guaranteed by making sure that the resident time of the droplets in the heat exchanger is appropriate. This approach is also applicable to heat exchangers used in other energy systems such as OTEC systems, where non-condensible gases are present in the evaporator as well as in the condenser. The use of such a uniform droplet size distribution is made possible by utilizing the fact that in liquids such as water, the heat conductivity is some seventy times larger than the diffusivity of gases. Thus, designating $v_d$ as the droplet velocity and $t_d$ as the residence time which a droplet is present within a droplet shower, it can be seen that:

$$t_d = H/v_d \tag{1}$$

where H is the height of the droplet shower. The depth $\delta_t$ to which heat penetrates a droplet from its surface is given by:

$$\delta_t = [(K)(t_d)]^{\frac{1}{2}} \tag{2}$$

where $K = 1.6 \times 10^{-7}$ m²/sec is the kinetic heat conductivity and $\delta g$, the depth to which gases penetrate a droplet is given by:

$$\delta g = [(k_g)(t_d)]^{\frac{1}{2}} \tag{3}$$

where Kg, the diffusivity of gases, is $2 \times 10^{-9}$ m²/sec for most gases. From equations (2) and (3), it can be deduced that:

$$\delta g = 0.11 \delta_t \tag{4}$$

For example, if $\delta_t = 0.7 r_d$, where $r_d$ is the droplet radius, then 97% of the droplet's volume will take part in the cooling process, while at the same time, only 22% on a volume basis of the non-condensable gases present in the droplet will be released in the condenser, since $\delta g = 0.08 r_d$. Thus, by ensuring that the majority of the liquid content of most of the droplets actively cools the condenser, e.g. $\delta_t \sim r_d$, only a minimal amount of gases will be released in the condenser. When brine is used instead of water as the cooling fluid, even less non-condensable gases will be present in the cooling fluid since their solubility in brine is some 10% smaller than that in water. Also, relatively low pressures will be achieved in the condenser due to the brine's relatively low vapor pressure when compared with water. On the other hand, however, due to these lower pressures, higher cooling temperatures can be used. Finally, if necessary, distilled water can be produced as a by-product of the condensing process.

Figure 2:
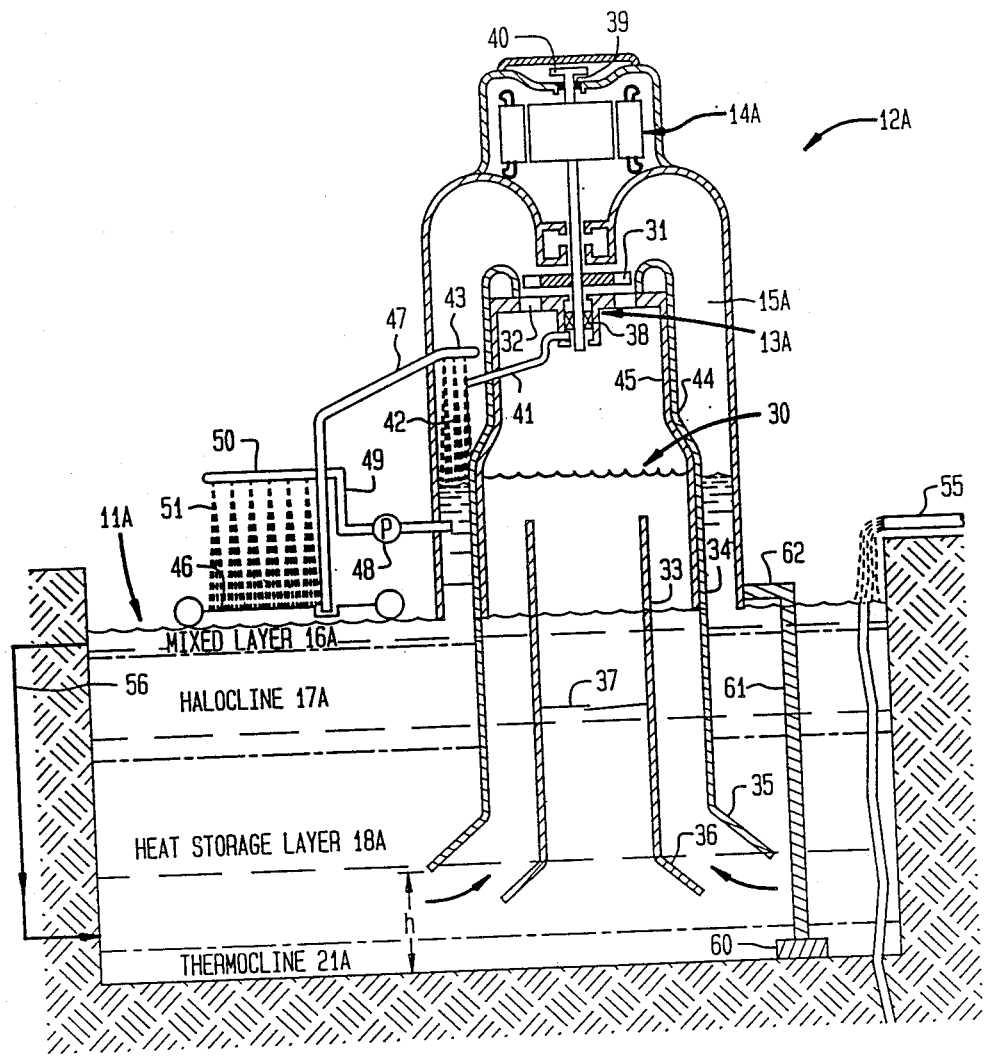
FIG. 2 is a schematic cross-sectional view of a particular embodiment of the present invention.

In a preferred embodiment of the present invention shown in FIG. 2, plant 12A principally comprises heat engine 13A, electric generator 14A and condenser 15A powered by solar pond 11A which includes wind mixed layer 16A, halocline 17A and heat storage layer 18A with thermocline 21A beneath the heat storage layer. Heat engine 13A anchored to foundation 60 on solar pond bottom 28 by members 61 and 62 further comprises flash evaporator 30, operating under vacuum, and positioned within solar pond 11A for producing steam from brine extracted from heat storage layer 18A. The steam is supplied to steam turbine 31 through nozzle block 32 to produce electricity by driving electric generator 14A. Preferably, turbine 31 is positioned directly above flash evaporator 30. Electric generator 14A may be a synchronous or an asynchronous generator. Use of flash evaporator 30, connected to inner conduit 33 and outer conduit 34 eliminates the necessity for pumping hot brine between the heat storage layer and the evaporator heat exchanger. Brine enters the space between inner conduit 33 and outer conduit 34 through inlet diffuser 35 and reaches flash evaporator 30 where vapors are produced due to the presence of below atmospheric pressure, and the resulting heat-depleted, heavier brine is returned to heat storage layer 18A through inner conduit 33 and diffuser 36. Preferably one-way valve 37, is connected to inner conduit 33 and ensures that only heavy, heat depleted brine returns through this conduit to the heat storage zone, preventing any possibility of lighter brine reaching flash evaporator 30 through this path. Also preferably, flash evaporator 30 has a large evaporation area and contains a demister (not shown) for guaranteeing that only vapors and no droplets are applied to turbine 31. Turbine 31, having radial bearings 38 and 39 and axial thrust bearings 40, lubricated by lubricating liquid operates on a relatively low pressure drop. Preferably, water is used as the lubricating liquid. However, alternatively oil may be used. In the present embodiment, water is supplied to the bearings from condenser 15A, through conduit 41 using a vacuum pump (not shown) and exits from the bearings via a drain (not shown). Condenser 15A is a direct-contact heat exchanger cooled by water droplets 42. In order to ensure that only liquid is applied to the bearings, a separation chamber (not shown) for separating any gases present is connected to the vacuum pump. The cross section of the upper portion of condenser 15A is relatively large and provides sufficient volume for droplets 42 exiting head 43 to make effective contact with the vapors leaving turbine 31, while its lower section has a smaller cross-sectional area for collecting liquid condensate and cooling water. In the present embodiment, condenser wall 44 is insulated by insulating layer 45 to minimize the amount of heat transferred to the condenser from flash evaporator 30. Cooling water for condenser 15A is furnished from floating cooling reservoir 46 to spray head 43 via conduit 47, with spray head 43 producing droplets with radii such that the majority of the liquid content of most of the droplets absorbs the heat extracted in condenser 15A, while releasing only a minimal amount of gases. Since condenser 15A operates under vacuum, the need for a pump to supply this cooling water is eliminated as the height of spray head 43 is usually less than 5 meters. However, if necessary, a pump can be used for supplying the cooling water to spray head 43. Expended cooling liquid and liquid condensate which collects in the lower portion of condenser 15A is extracted by pump 48 to shower head 50 through conduit 49 where it is cooled in cooling shower 51. By using a floating reservoir over which a cooling shower is produced, pumping losses are minimized since this reservoir can be positioned in relatively close vicinity to power plant 12A. Also, due to the proximity of cooling shower 51 to power plant 12A and since plant 12A including flash evaporator 30 is positioned within solar pond 11A, use of costly piping is avoided.

In order to compensate for the increased density of brine in heat storage layer 18A due to the operation of flash evaporator 30, some water is extracted from the solar pond preferably from mixed layer 16A and introduced into the heat storage layer as indicated by line 56. As a result, the amount of make-up water in the present embodiment furnished via pipe 55 to the wind mixed layer to maintain the surface of the solar pond at a substantially constant level against evaporation is equal to the quantity of water added to the heat storage layer plus the quantity of water evaporated from the solar pond. Also, since water is extracted from wind-mixed layer 16A, the depth of this layer is relatively small and consequently the efficiency of the solar pond as a collector of solar energy is enhanced. In addition, solar pond 11A can be operated as either a falling, standing or ascending pond as explained in U.S. Pat. No.: 4,440,148 pat. However, in the present embodiment, the pond is preferably operated as a standing pond.

The operating characteristics of the flash evaporator itself are determined by the height h of the entrance of diffusers 35 and 36 from solar pond bottom 28 and the brine flow cross-sectional area A of the brine entering the flash evaporator from the heat storage layer through outer conduit 34. In fact, this is true for all such flash evaporators. The velocity V of the hotter, lighter brine and heat-depleted, heavier brine entering and returning from flash evaporator through diffusers 35 and 36 respectively is determined by:

$$V = [(g')(h)/2]^{\frac{1}{2}} \tag{5}$$

where $g'$ is the reduced gravity. Reduced gravity $g'$ is given as follows:

$$g' = g(\rho_2 - \rho_1)/\rho \tag{6}$$

where $g$ is the gravitational acceleration constant, $\rho_1$ is the density of the brine flowing into the flash evaporator, $\rho_2$ is the density of the brine flowing out of the flash evaporator and $\rho$ is the average density of the brine below the entrance of diffusers 35 and 36. Designating density difference $\Delta\rho$, temperature difference $\Delta T$ and salinity difference $\Delta S$ respectively as follows:

$\Delta\rho = \rho_2 - \rho_1$,
$\Delta T = T_1 - T_2$,
  $T_1$ being the temperature of brine flowing into the flash evaporator, and
  $T_2$ being the temperature of brine flowing out of the flash evaporator,
$\Delta S = S_2 - S_1$,
  $S_2$ being the salinity of brine flowing out of the flash evaporator, and
  $S_1$ being the salinity of brine flowing into the flash evaporator,
the ratio of density difference $\Delta\rho$ to average $\rho$ is as follows $$\Delta\rho/\rho = (\alpha'')(\Delta T) \tag{7}$$

where $\alpha''$ is the global brine density correction factor and is determined as follows:

$$\alpha'' = \alpha + (\beta)(\Delta S)/(\Delta T) \tag{8}$$

Here $\alpha$ is the brine thermal expansion coefficient and determined by:

$$\alpha = (1/\rho)(\partial\rho/\partial T) \tag{9}$$

$\partial\rho/\partial T$ being the partial derivative of the brine density with respect to temperature, while $\beta$ is the brine salinity correction coefficient and determined by:

$$\beta = (1/\rho)(\partial\rho/\partial S) \tag{10}$$

$\partial\rho/\partial S$ being the partial derivative of the brine density with respect to salinity. Substituting relationships (6) and (7) into Eq. (5) permits this equation to be rewritten as follows:

$$V = [(g)(h)(\alpha'')(\Delta T)/2]^{\frac{1}{2}} \tag{11}$$

The heat flux Q (in watts) of the brine in the flash chamber is determined by:

$$Q = (\rho)(C_p)(V)(A)(\Delta T) \tag{12}$$

where $C_p$ is the specific heat of the brine. Solving equations (11) and (12) yields the following equation:

$$Q = (\rho)(C_p)[(g)(\alpha'')/2]^{\frac{1}{2}}(\Delta T)^{3/2}(h)^{\frac{1}{2}}(A) \tag{13}$$

showing that for a certain brine temperature difference $\Delta T$, the heat flux Q is determined by height h and inlet brine flow cross-sectional area A. Thus, actually, the convection currents at the inlet and outlet of diffusers 33 and 34 determine the heat flux and consequently the operating conditions of the flash evaporator. By expressing the flash evaporator operating temperature $T_f$ as follows:

$$T_f = T_1 - \Delta T \tag{14}$$

where $T_1$ is the brine inlet temperature, it can be seen from Eq. (13) that for a given heat flux, the brine temperature difference can be minimized by making either height h or area A or both relatively large, and consequently the operating temperature of the flash evaporator will approach the brine inlet temperature. In this manner high efficiency levels can be achieved. Also, in the case where inlet diffuser 34 is round in shape, A may be expressed by the following relationship IIDh where D is the diameter of diffuser 34 at the brine entrance and substitution of this relationship in Eq. (13) shows that diameter D and height h will determine heat flux Q. By way of example, if heat flux Q is $10^7$ watts, $Cp=3,000$ j/kg, $\rho=1200$ kg/m$^3$, $\alpha''=10^{-3}(° C.^{-1})$ then $\Delta T=(2.7)/(h)(D)^{\frac{2}{3}}$.

The net energy conversion efficiency level of the power plant described in the present embodiment having brine in heat storage layer 18A at a temperature of 90° C. will be close to 10% with parasitic losses being minimal and approximately 0.6%. These parasitic losses are mainly due to the use of a small vacuum pump in condenser 15A and cooling shower pump 48. Also, it is estimated that the cost of the power plant will be around $(U.S.) 300/KW. In comparison, the net energy conversion efficiency level of a conventional solar pond power plant is only 6% with parasitic losses being about 2.3% and its cost is approximately $(U.S.) 1,500/KW.

While FIG. 2 shows condenser 15A external to flash evaporator 30, plant 12A can be constructed in alternative configurations. For example, the condenser may be positioned within the flash evaporator chamber, with the expended cooling fluid and liquid condensate being extracted through a suitable conduit to an external cooling shower. Also, while in the present embodiment plant 12A is positioned within the solar pond, it is possible, where convenient, to position and operate the plant and particularly the flash evaporator 30 external to the solar pond, with brine inlet and outlet conduits connecting the heat storage layer to the flash evaporator.

It is believed that the advantages and improved results furnished by the method and apparatus of the present invention are apparent from the foregoing description of the embodiments of the invention. Various changes and modifications may be made without departing from the spirit and scope of the invention as described in the claims that follow.

What is claimed is:

1. A method for producing power from a salt water solar pond having an upper wind-mixed layer, a halocline and a lower convective heat storage layer for storing heat from solar radiation incident on the surface of the solar pond, said method comprising the steps of
   (a) using heat from said storage layer to operate a power plant having a heat engine producing power and heat depleted working fluid, and having a condenser; and
   (b) cooling the heat depleted working fluid in the condenser using a direct contact heat exchange with droplets of fluid from the upper wind-mixed layer; and
   (c) selecting the size of the droplets and their residence time in the condenser such that the majority of the liquid content of most of the droplets absorbs the heat transferred in the condenser while releasing a minimum amount of gases contained in the droplets.

2. A method according to claim 1 wherein said power plant is located in the salt water solar pond.

3. A method according to claim 1 wherein said heat engine includes a flash evaporator for producing steam from heat contained in said storage zone and a low pressure steam turbine, connected to a generator, responsive to the passage of said steam for producing power 4. A method according to claim 3 wherein water from the pond is added to the heat storage layer and halocline for maintaining the functional relationship of salinity with depth in the halocline.

5. A method according to claim 4 wherein the added water is from the said mixed layer.

6. A method according to claim 3 wherein the said steam turbine is positioned directly above said flash evaporator.

7. Apparatus according to claim 1 wherein said power plant is located in the solar pond.

8. A method according to claim 1 wherein said condenser is a direct-contact liquid/vapor heat exchanger.

9. A method according to claim 8 wherein the size of said droplets is selected such that the heat extracted in the condenser penetrates to at least 60 percent of the radius of the majority of the droplets.

10. A method according to claim 8 wherein said condenser further comprises a vacuum pump for maintaining condenser below atmospheric pressure.

11. A method according to claim 8 wherein said steam turbine includes liquid vacuum pump means for supplying liquid from said condenser to the bearings of said turbine for lubricating said bearings.

12. A method according to claim 8 wherein said liquid is water.

13. A method according to claim 8 wherein said liquid is brine.

14. A method according to claim 8 wherein said condenser further comprises means for extracting and spraying liquid from said condenser into the air for cooling said liquid.

15. A method according to claim 14 wherein said liquid is sprayed over material floating on the surface of the upper wind-mixed layer producing a liquid reservoir.

16. Apparatus for producing power from a salt water solar pond having an upper wind-mixed layer, a halocline and a lower convective heat storage layer for storing heat from solar radiation incident on the surface of said solar pond, said apparatus comprising:
   (a) a power plant having a heat engine responsive to heat from said storage layer for producing power and heat depleted steam, and having a condenser for receiving the heat depleted steam;
   (b) a direct contact heat exchanger for cooling the heat depleted steam in the condenser with liquid droplets of cool water; and
   (c) said direct contact heat exchanger being constructed and arranged so that the size of the droplets of cool water and the residence time of the droplets in the condenser is such that the majority of the liquid content of most of the droplets absorbs the heat transferred in the condenser while releasing a minimum amount of gases contained in the droplets.

17. Apparatus according to claim 16 wherein said direct contact heat exchanger comprises a housing for containing said liquid droplets constructed and arranged such that the residence time of said droplets in the housing is sufficient to permit heat to penetrate to the majority of the liquid content of most of the droplets while releasing a minimal amount of gases in said droplets.

18. A power plant utilizing a salt water solar pond having an upper wind-mixed layer, a halocline and a lower convective storage layer for storing heat from solar radiation incident on the surfaces of said solar pond, said power plant comprising:
   (a) a flash evaporator for producing steam from heat contained in said storage layer;
   (b) a low pressure steam turbine connected to a generator and being responsive to the passage of said steam for producing power;
   (c) a direct-contact condenser for cooling steam exiting said turbine and producing condensate;
   (d) means for maintaining said condenser below atmospheric pressure;
   (e) means for extracting and spraying condensate from said condenser into ambient air to form a spray for cooling the condensate, said spray and condensate being collected in a liquid reservoir; and
   (f) means for supplying liquid from said liquid reservoir to said condenser in the form of droplets whose size and residence time is such that the majority of the liquid content of most of the droplets absorbs the heat transferred in the condenser while releasing a minimum amount of gases contained in the droplets.

19. A power plant according to claim 18 wherein said power plant is located in the salt water solar pond and said liquid reservoir floats on the upper wind-mixed layer of the salt water solar pond.

20. A method for producing power from a salt water solar pond having an upper wind-mixed layer, a halocline and a lower convective storage layer for storing heat from solar radiation incident on the surface of said solar pond, said method comprising the steps of:
   (a) using heat from said storage layer to operate a power plant having a heat engine for producing heat depleted working fluid, and having a condenser;
   (b) cooling the heat depleted working fluid in the condenser using a direct-contact heat exchange with fluid from the upper wind-mixed layer;
   (c) said direct contact heat exchanger being constructed and arranged so that the size of the droplets of cool water and the residence time of the droplets in the condenser is such that the majority of the liquid content of most of the droplets absorbs the heat transferred in the condenser while releasing a minimum amount of gases contained in the droplets.

21. A method for producing power from a salt water solar pond having an upper wind-mixed layer, a halocline and a lower convective storage layer for storing heat from solar radiation incident on the surface of said solar pond, said method comprising the steps of:
   (a) using heat from said storage zone to operate a power plant located in said solar pond, said power plant having a flash evaporator for producing steam, a low pressure steam turbine connected to a generator, and a direct contact condenser;
   (b) supplying said steam to the steam turbine for producing power and exhaust steam; and
   (c) contacting said exhaust steam with droplets of water from a reservoir floating on the upper wind-mixed layer of the pond to form condenser liquid; and
   (d) extracting condenser liquid from said condenser and spraying said condenser liquid into the air over said reservoir for cooling the condenser liquid.
   (c) contacting said exhaust steam with droplets of water from a reservoir floating on the upper wind-mixed layer of the pond to form condenser liquid; and
   (d) extracting condenser liquid from said condenser and spraying said condenser liquid into the air over said reservoir for cooling the condenser liquid.

22. A method according to claim 21 including the step of causing the size of the droplets of cool water, and their residence time of the droplets in contact with the exhaust steam, to be such that the majority of the liquid content of most of the droplets absorbs heat in the formation of said condenser liquid while releasing a minimal amount of gases contained in the droplets.

23. A method according to claim 21 including the step of selecting the size of the droplets of cool water and their residence time of the droplets in contact with the exhaust steam to release a minimal amount of gases contained in the droplets.

24. Apparatus for producing power using a salt water solar pond having an upper convective wind-mixed layer, a lower convective heat storage layer for storing heat from solar radiation incident on the surface of the pond, and a non-convective halocline intermediate the wind-mixed layer and the heat storage layer, said apparatus comprising:
   (a) a flash evaporator associated with said heat storage layer for producing steam from brine in said heat storage layer;
   (b) a steam turbine responsive to said steam for producing power and heat depleted steam;
   (c) a condenser for receiving said heat depleted steam;
   (d) a reservoir of cool water; and
   (e) spray means for spraying water from said reservoir into said condenser for direct contact with the heat depleted steam therein;
   (f) said condenser being constructed and arranged so that the size of the droplets of cool water and the residence time of the droplets in the condenser is such that the majority of the liquid content of most of the droplets absorbs the heat transferred in the condenser while releasing a minimum amount of gases contained in the droplets.

25. Apparatus according to claim 24 wherein said spray means is constructed and arranged to minimize the release of gases dissolved in the water sprayed into said condenser.

26. Apparatus in accordance with claim 24 wherein said spray means produces droplets of water whose size and residence time in the condenser is such that the release of gases dissolved in the droplets is minimized.

27. Apparatus according to claim 24 wherein said flash evaporator is in the form of a vertically oriented first cylindrical sleeve having a lower end opening in brine contained in the heat storage layer and having an upper end projecting above the surface of the pond, and a vertically oriented second cylindrical sleeve surrounding and concentric with the first cylindrical sleeve for forming an annular chamber that functions as said condenser; said second cylindrical sleeve having a lower free end opening into the wind-mixed layer of the pond and an upper closed end; said first cylindrical sleeve forming a flash chamber within which steam is produced from said brine; means separating the upper end of the first cylindrical sleeve from the annular chamber for directing steam produced in said flash chamber to said turbine; means for directing heat depleted steam from said turbine into said annular chamber; said spray means being constructed and arranged to spray water from said reservoir into said annular chamber to form a liquid comprising water from said reservoir and condensed steam.

28. Apparatus accoding to claim 27 wherein said spray means is constructed and arranged to minimize the release of gases dissolved in the water sprayed into said condenser.

29. Apparatus according to claim 27 wherein said spray means produces droplets of water whose size and residence time in the condenser is such that the release of gases dissolved in the droplets is minimized.

30. Apparatus according to claim 27 wherein said reservoir floats on said wind-mixed layer.

31. Apparatus according to claim 27 including means for spraying liquid from the annular chamber into ambient air above said reservoir.

* * * * *